United States Patent [19]

Summers et al.

[11] Patent Number: 4,685,964

[45] Date of Patent: Aug. 11, 1987

[54] METHOD AND APPARATUS FOR PRODUCING MOLTEN IRON USING COAL

[75] Inventors: Frank V. Summers, Charlotte, N.C.; John C. Scarlett, Toledo, Ohio; David C. Meissner, Charlotte; Glenn E. Hoffman, Pineville, both of N.C.

[73] Assignee: Midrex International B.V. Rotterdam, Zurich, Switzerland

[21] Appl. No.: 783,517

[22] Filed: Oct. 3, 1985

[51] Int. Cl.$^4$ ............................................. C21B 11/00
[52] U.S. Cl. ........................................ 75/38; 266/160
[58] Field of Search ...................... 75/35, 38; 266/160

[56] References Cited

U.S. PATENT DOCUMENTS

| | | | |
|---|---|---|---|
| 3,853,538 | 12/1974 | Nemeth | 75/35 |
| 4,008,074 | 2/1977 | Rossner et al. | 75/43 |
| 4,248,626 | 2/1981 | Scarlett | 75/38 |
| 4,412,858 | 11/1983 | Viramontes-Brown et al. | 75/40 |
| 4,542,889 | 9/1985 | Vuletic | 266/137 |

*Primary Examiner*—Melvyn J. Andrews
*Attorney, Agent, or Firm*—Ralph H. Dougherty

[57] ABSTRACT

A highly efficient method and apparatus for production of molten iron using coal by coal gasification in a molten iron gasifier-melter. The gasifier-melter is coupled to a direct reduction shaft furnace and utilizes both the gaseous and solid output of the shaft furnace. The process is especially efficient when using non-metallurgical coals.

13 Claims, 1 Drawing Figure

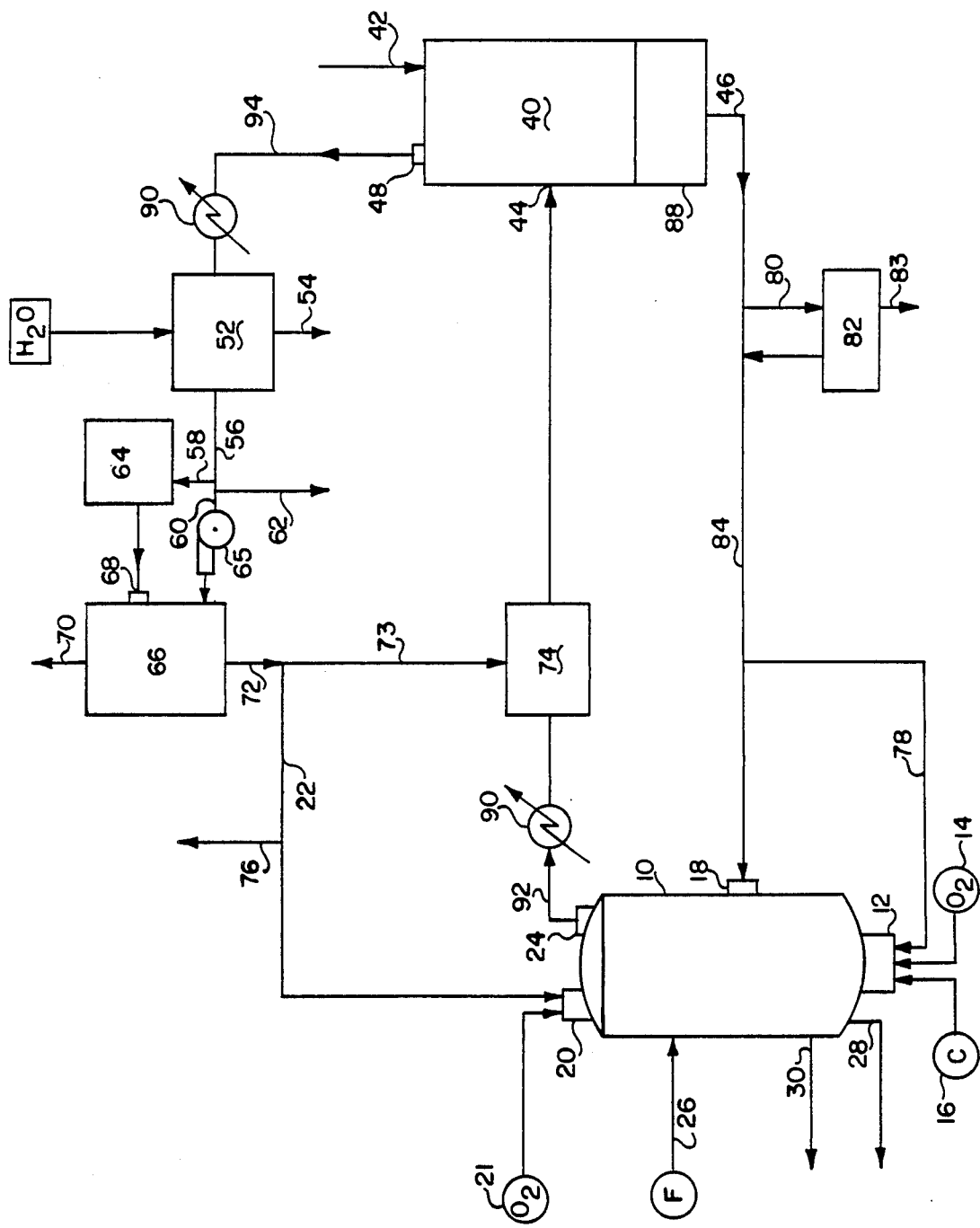

METHOD AND APPARATUS FOR PRODUCING MOLTEN IRON USING COAL

BACKGROUND OF THE INVENTION

This invention relates to an improvement in molten bath gasifier-melters for producing molten iron with continuous melting of iron feed in a bath. The invented method is particularly applicable to the use of non-metallurgical coals.

It is known to feed pulverized coal and oxygen to the bottom of a melter-gasifier and to inject oxygen to burn some of the coal gas evolved from the molten bath in order to heat and melt the iron charge fed to the top of the vessel. Difficulties encountered are inefficient heating of the bath and localized combustion.

U.S. Pat. No. 4,317,677 of Weber, et al., teaches a fluidized bed gasifier wherein a fluidized bed of coal is formed above a hearth. Water or steam and/or hydrocarbon are introduced through the side of the gasifier and oxygen is also introduced through the side of the gasifier at a lower elevation. The fluidized bed gasifier is coupled directly to a direct reduction furnace above the gasifier, the gases from the gasifier being removed, cleaned, cooled, then introduced into the furnace wherein they act as reducing gases. The direct reduced iron drops directly from the discharge of the furnace through the fluidized bed into the molten metal bath. This differs substantially from the present invention wherein gas from the gasifier-melter is mixed with some recycled gas and introduced to a shaft furnace and the spent top gas is cleaned and cooled, then a portion is mixed with the gasifier gas and a second portion is introduced directly into the gasifier-melter. The present invention makes more efficient use of the gases than any previously known molten bath gasifier-melter.

Other prior art patents relating to molten bath gasifier-melters, including Hartwig U.S. Pat. No. 4,007,034, Morvay U.S. Pat. No. 2,750,278, Sanzenbacher, U.S. Pat. No. 4,238,226, and Halley U.S. Pat. No. 2,889,219, do not use a fluidized bed.

Another known process utilizes coal gas from a molten bath coal gasifier-melter to produce direct reduced iron. In this process it is undesirable to produce excess gas which requires export for usage outside of the battery limits of an associated direct reduction plant or the utility system which serves the direct reduction plant. The gas produced is employed to produce a highly metallized direct reduced iron. Direct reduction plants generally produce products having about 92% metallization.

SUMMARY OF THE INVENTION

A highly efficient method and apparatus for production of molten iron using non-metallurgical coal by coal gasification in a molten iron bath gasifier-melter, which is coupled to a direct reduction furnace and utilizes both the gaseous and solid output of the direct reduction furnace.

OBJECTS OF THE INVENTION

It is the principal object of this invention to provide a method for producing molten metal from direct reduced iron, while efficiently utilizing the energy values within the direct reduction system.

It is also an object of this invention to provide a method for producing molten iron utilizing the full chemical energy of partially spent reducing gas from the direct reduction process to provide the fuel required in the gasifier-melter.

It is another object of this invention to utilize, if required for a particular production site, the full chemical energy content of the partially spent discharge gas or top gas from the reduction furnace to provide the fuel needed in the gasifier-melter to melt the direct reduced iron produced and to provide for efficient re-utilization of the energy values in the direct reduction system.

BRIEF DESCRIPTION OF THE DRAWINGS

These and other objects are better understood by referring to the following detailed description and the appended drawing, in which:

The single FIGURE is a schematic flow sheet of the method of the invention showing all of the equipment required to carry out the invented method.

DETAILED DESCRIPTION

Referring now to the drawing, a molten iron gasifier-melter 10 is provided with one or more tuyeres 12 in its bottom wall, each tuyere being connected to a source 14 of oxygen and a source 16 of coal dust. The gasifier-melter 10 has a direct reduced iron introduction means 18, an oxyfuel burner 20 fueled by oxygen from source 21 and recycled gas from line 22. The gasifier-melter also has a product gas outlet 24, a flux injection means 26, a molten iron tap 28 and a slag tap 30.

A direct reduction furnace 40 is provided with an iron oxide feeding inlet 42 at its top, a reducing gas inlet system 44 intermediate the ends of the furnace, and a direct reduced iron product outlet 46 at the bottom of the furnace. A reacted gas outlet or offtake 48 is provided at the top of the furnace, which outlet communicates with a scrubber 52. Sludge is removed at 54 in the form of a slurry. The gas outlet from the scrubber, gas line 56, connects to three gas lines 58, 60, and 62.

Gas line 58 communicates with a steam plant 64 and provides combustible fuel for the steam plant. Gas line 60 is connected to a carbon dioxide removal system 66. Steam enters the carbon dioxide removal system at 68. Carbon dioxide is removed at 70 and $CO_2$-lean gas is removed at 72. Export fuel gas can be removed from the system through gas removal pipes 62 or 76 if desired, or if required elsewhere in the process.

The $CO_2$-lean gas is again divided, a portion moving through conduit 73 to a gas mixer 74 (temper mixer). A second portion passes through conduit 22 to oxyfuel burner 20 of the gasifier-melter 10.

In operation, molten iron gasifier-melter 10 receives a mixture of coal dust and oxygen through tuyeres 12 located in the bottom of the gasifier-melter. Direct reduced iron, preferably in the form of metallized iron fines, may be fed from a direct reduction furnace. Metallized iron fines are fed through the top of the gasifier-melter through introduction means 18 if in large particulate form, or they are fed through the bottom of the gasifier-melter from conduit 78 with the coal, if in finely divided form. A flux from source F, consisting of lime or calcined dolomite, along with other fluxing agents, is fed to the gasifier-melter through line 26 or through tuyere 12 in the bottom of the gasifier-melter, as desired. Calcium oxide in the flux serves to maintain fluidity of the slag and act as a sulfur acceptor to bulk desulfurize the gas produced in the gasifier-melter. To provide additional heat to melt all of the metallized iron fines fed to the gasifier-melter, a self-cooling oxy-fuel burner 20, fueled with recycle gas from conduit 22 which has been processed to produce a water and carbon dioxide lean gas, is provided in the roof of the gasifier-melter.

The product gas from the gasifier-melter is removed through outlet 24 and delivered to a mix station 74 where carbon dioxide lean top gas is heated to temper the product gas from the gasifier-melter system to between 760 and 900 C. This temper gas is introduced to direct reduction furnace 40 through inlet 44, wherein it is used as reducing gas to reduce iron oxide to a highly metallized form of direct reduced iron. Preferably, all of the direct reduced iron removed from the direct reduction furnace at product outlet 46 is fed to the gasifier-melter 10. However, some of the direct reduced iron may be removed at 80 to stockpile 82 for later use in the gasifier-melter, or removed at 83 for use elsewhere. Additional metallized iron fines from stockpile 82, either cold or preheated, may be combined with the direct reduced iron in conduit 84 to form the feed to the gasifier-melter.

As the gas reacts countercurrently with the iron oxide in the reduction furnace, an equilibrium barrier is approached in the utilization of all of the hydrogen and carbon monoxide caused by thermodynamic limits. Therefore, the top gas from the reduction system contains valuable hydrogen and carbon monoxide. It is cooled and scrubbed in cooler-scrubber 52 in preparation for reuse. During the cooling process it is possible to produce some of the steam required for the regeneration unit in the carbon dioxide removal system by indirect heat exchange. A small part of the cooled and scrubbed top gas is then diverted to a steam plant 64 as fuel to generate all or at least the remainder of the steam required. The remaining portion of the scrubbed top gas is compressed in a compressor 65 and delivered to the carbon dioxide removal system 66. The carbon dioxide lean recycle gas produced in the carbon dioxide removal system 66 provides the fuel for the oxy-fuel burner 20 of the gasifier-melter 10, and also provides the gas required to temper the product gas from the gasifier-melter in mixer 74 to the temperature required for reduction, as previously described.

The system is surprisingly well balanced, leading to an unexpectedly high efficiency and low coal requirements. If extra top gas is developed because of changes in coal composition, more of the recycle gas may be added to the oxy-fuel burner for reheat, and less coal/oxygen mixture need be fed to the gasifier-melter. If more recycle gas is needed to feed the substoichiometric oxy-fuel burner, the temperature of the bath can be lowered from 1500° C. to as low as 1400° C., releasing some recycle gas from its use as a temper gas for use as a burner fuel. If even more recycle gas is needed, steam can be produced from the hot coal gas also releasing recycle gas used for tempering and for use as a burner fuel.

PROCESS EXAMPLE

To illustrate the performance of the process, the performance of a molten bath gasifier-melter operating at 1500° C. was calculated. The process system selected includes indirect heat exchange to produce steam by recovering energy from the hot top gas (also known as spent reducing gas) discharged from the iron oxide reduction furnace. The carbon dioxide is removed by an energy efficient carbon dioxide removal system, such as one of the hot potassium carbonate processes. The remaining steam needed by the carbon dioxide removal unit is produced by burning scrubbed top gas. In this example, no steam is produced from the sensible heat of the product gas from the gasifier-melter. A dry powdered Saar coal is used in the gasifier-melter. Carbon dioxide lean gas is used in a substoichiometric burner to provide the extra heat required to melt all of the direct reduced iron fed to the gasifier-melter. No export gas is produced beyond the battery limit, although other process conditions could allow some export gas. The analysis of the Saar coal is given in Table I.

TABLE I

| Saar Coal Dust Analysis on Moisture-Free (M.F.) Basis | |
| --- | --- |
| Carbon | 75.2 wt. % |
| Hydrogen | 5.0 |
| Nitrogen | 1.5 |
| Oxygen | 9.0 |
| Sulfur | 1.6 |
| Ash | 7.7 |

Moisture in feed coal is 0.025 Kg/Kg M.F. Coal
Lower heating value (M.F.) is 7230 Kcal/Kg Important solids analysis and solids flow rates per tonne of molten iron and per tonne of direct reduced iron (DRI) are presented in Tables II and III.

TABLE II

| | Solids Flow Rate per Tonne | |
| --- | --- | --- |
| | t/t DRI | t/t Molten Iron |
| Iron Oxide | 1.41 | 1.49 |
| Lime | 0.059 | 0.062 |
| DRI (production/consumption) | 1.0 | 1.055 |
| Coal (M.F.) | 0.435 | 0.459 |

TABLE III

| | Analysis of Iron Containing Raw Material, Intermediate and Product | | | | |
| --- | --- | --- | --- | --- | --- |
| | Wt % | | | | |
| | Fe$_2$O$_3$ | FeO | Fe | Gangue | C |
| Iron Oxide | 97.0 | — | — | 3.0 | — |
| DRI | — | 8.4 | 86.0 | 4.1 | 1.5 |
| Molten Iron* | — | — | 96.8 | — | 3.0 |

NOTE:
*The molten iron does not add exactly to 100% because of contained silicon, etc.

Important gas analysis and flow rates are presented in Tables IV and V.

TABLE IV

| | Gas Analysis of Important Streams | | | | | |
| --- | --- | --- | --- | --- | --- | --- |
| Stream | CO | CO$_2$ | H$_2$ | H$_2$O | CH$_4$ | Ar + N$_2$ |
| Oxygen | — | — | — | — | — | 2 |
| Raw Gas | 61.0 | 6.0 | 22.0 | 8.5 | — | 2.5 |
| To Reduction Furnace | 55.3 | 5.5 | 29.4 | 2.9 | .8 | 6.1 |
| Top Gas | 34.7 | 25.9 | 21.1 | 11.2 | 1.0 | 6.1 |
| Recycle, CO$_2$ Lean Gas | 53.8 | 1.0 | 32.7 | 1.5* | 1.5 | 9.5 |

TABLE V

| Gas Flow Rate Per Tonne of DRI | |
| --- | --- |
| Stream | Flow Rate |
| Oxygen (98%) | 345 normal cubic meters |
| Raw Gas | 1012 |
| To Reduction Furnace | 2059 |
| Top Gas | 2039 |
| Recycle, CO$_2$ Lean Gas | 1189 |
| Recycle to Temper | 1047 |
| Recycle to Gasifier-Melter | 142 |

TABLE V-continued

| Gas Flow Rate Per Tonne of DRI | |
|---|---|
| Stream | Flow Rate |
| $CO_2$ Removed | 465 |
| Steam Production | 883 Kg |
| Percent Steam from Heat Recovery from Top Gas | 34% |
| Percent of Top Gas to Fuel Steam Plant | 9.7% |

The temperature of the feed gas is 815° C. When operating under these conditions, the coal requirement is 3.44 Gcal (HHV) or 3.32 Gcal (LHV) per tonne of molten iron.

ALTERNATIVE EMBODIMENTS

The direct reduction furnace 40 can be a shaft furnace or a fluidized bed furnace. The lower portion 88 of the furnace can constitute a cooling zone to cool the reduced metallized iron product.

In order to totally utilize the energy available in the system, a stem generator 90 can be placed in the gasifier gas conduit 92, or in the top gas conduit 94.

It is clear from the foregoing specification that other modifications can be made and still be within the scope of the invention. Therefore, it is to be understood that the invention is limited only by the scope of the appended claims.

We claim:

1. Apparatus for producing molten iron comprising:
   a. a molten iron bath gasifier-melter having a top and a bottom;
   b. an associated direct reduction shaft furnace having a metal oxide feed means at the top thereof and a metallized product removal means at the bottom thereof;
   c. means for introducing particulate coal and oxygen through said bottom of said gasifier-melter;
   d. inlet means positioned between said top and said bottom of said gasifier-melter for introducing direct reduced iron to said gasifier-melter;
   e. a gasification gas outlet at the top of said gasifier-melter;
   f. a first conduit communicating with said gasification gas outlet and a reducing gas inlet to said direct reduction shaft furnace;
   g. a gas mixer in said first conduit;
   h. a scrubber-cooler;
   i. a reacted top gas outlet at the top of said shaft furnace;
   j. a second conduit communicating with said scrubber-cooler and said reacted top gas outlet;
   k. a carbon dioxide removal system;
   l. a third conduit communicating with said scrubber-cooler and said carbon dioxide removal system; and
   m. a fourth conduit communicating with said carbon dioxide removal system and said gas mixer.

2. Apparatus according to claim 1 further comprising a steam generator communicating with said second conduit.

3. Apparatus according to claim 1 further comprising a fifth conduit communicating with said carbon dioxide removal system and said gasifier-melter.

4. Apparatus according to claim 3 further comprising export gas removal means communicating with said fifth conduit for removing cleaned and cooled reacted top gas.

5. Apparatus according to claim 1 further comprising means for introducing oxygen into said gasifier-melter above the surface of the bath therein.

6. Apparatus according to claim 1 further comprising means in said melter-gasifier for introducing flux into said melter-gasifier.

7. Apparatus according to claim 1 further comprising a steam generator communicating with said first conduit.

8. Apparatus according to claim 1 further comprising export gas removal means communicating with said third conduit for removing cleaned and cooled reacted top gas.

9. A method for producing molten iron, comprising:
   a. introducing particulate coal and oxygen to the bottom of a closed gasifier-melter chamber;
   b. driving the direct reduced iron output of an associated direct reduction shaft furnace into a coarse fraction of large particles and a fine fraction of finely divided particles;
   c. injecting the coarse fraction of direct reduced iron into the gasifier-melter above the surface of the bath, and injecting the fine fraction of direct reduced iron into the gasifier-melter through tuyeres beneath the surface of the bath;
   d. reacting said coal and oxygen to form a gasification gas within the gasifier-melter;
   e. removing gasification gas from the top of the gasifier-melter;
   f. mixing said gasification gas with carbon dioxide-lean spent top gas from a direct reduction furnace to form a reducing gas;
   g. delivering reducing gas to the inlet of a direct reduction furnace;
   h. feeding metal oxide to said direct reduction furnace, and removing metallized product therefrom;
   i. removing reacted top gas from the top of the direct reduction furnace; and
   j. cooling and scrubbing removed reacted top gas and removing carbon dioxide therefrom to form said carbon dioxide-lean spent top gas.

10. A method according to claim 9 further comprising burning a portion of said carbon dioxide-lean gas in the gasifier-melter to provide additional heat.

11. A method according to claim 9 further comprising utilizing waste heat from the direct reduction furnace top gas to produce steam by indirect heat exchange.

12. A method according to claim 9 further comprising utilizing waste heat from gasification gas by indirect heat exchange.

13. A method according to claim 9 further comprising removing cleaned scrubbed top gas as export fuel.

* * * * *

UNITED STATES PATENT AND TRADEMARK OFFICE
CERTIFICATE OF CORRECTION

PATENT NO. : 4,685,964
DATED : August 11, 1987
INVENTOR(S) : Frank V. Summers, John C. Scarlett, David C. Meissner
Glenn E. Hoffman It is certified that error appears in the above—identified patent and that said Letters Patent is hereby corrected as shown below:

In Column 6, Line 27, change "driving", to -- dividing --.

In Column 6, Line 46, change "thereform", to -- therefrom --.

Signed and Sealed this

Twenty-fourth Day of May, 1988

*Attest:*

DONALD J. QUIGG

*Attesting Officer*     *Commissioner of Patents and Trademarks*